(12) United States Patent
Voorsluys et al.

(10) Patent No.: US 11,206,803 B2
(45) Date of Patent: Dec. 28, 2021

(54) MILKING ROBOT SYSTEM WITH SELECTABLE COMPLIANCE

(71) Applicant: LELY PATENT N.V., Maassluis (NL)

(72) Inventors: Mario Henrique Voorsluys, Maassluis (NL); Michiel Adriaan Van Dorp, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 2 days.

(21) Appl. No.: 16/628,727

(22) PCT Filed: Jun. 15, 2018

(86) PCT No.: PCT/NL2018/050393
§ 371 (c)(1),
(2) Date: Jan. 6, 2020

(87) PCT Pub. No.: WO2019/017769
PCT Pub. Date: Jan. 24, 2019

(65) Prior Publication Data
US 2020/0187448 A1    Jun. 18, 2020

(30) Foreign Application Priority Data
Jul. 21, 2017 (NL) .................................... 2019313

(51) Int. Cl.
*A01J 5/007* (2006.01)
*A01J 5/017* (2006.01)
(52) U.S. Cl.
CPC ............. *A01J 5/0175* (2013.01); *A01J 5/007* (2013.01)
(58) Field of Classification Search
CPC .......... A01J 5/0175; A01J 5/007; A01J 5/017; A01K 1/12
See application file for complete search history.

(56) References Cited

U.S. PATENT DOCUMENTS 4,022,158 A * 5/1977 Flocchini ............... A01J 5/017
119/14.14
5,769,025 A   6/1998 van der Lely et al.
(Continued)

FOREIGN PATENT DOCUMENTS

EP   0 880 888 A2   12/1998
EP   0 880 888 A3   12/1998
(Continued)

OTHER PUBLICATIONS

International Search Report dated Oct. 30, 2018 in PCT/NL2018/050393 filed on Jun. 15, 2018.

*Primary Examiner* — Joshua D Huson
*Assistant Examiner* — Megan J Moroney
(74) *Attorney, Agent, or Firm* — Oblon, McClelland, Maier & Neustadt, L.L.P.

(57) ABSTRACT

A milking system for milking a dairy animal comprises teat cups, a robot arm with actuators, for connecting the teat cups to teats of the dairy animal, and a control device in order to reach and/or maintain a desired position of the robot arm, by adjustment of a respective adjusting force parameter exerted by the actuators. The control device is configured to adjust a selectable compliance of the robot arm, wherein the compliance is a reaction of the robot arm to an external force which is exerted on the robot arm, such as a kick. This compliance is a function of the external force or of an animal identity. Thus, the behaviour of the robot arm can be adapted, such as, under otherwise unchanged circumstances, more or earlier yielding in the case of sensitive animals, and, conversely, less in the case of playful animals.

17 Claims, 3 Drawing Sheets

(56) References Cited

U.S. PATENT DOCUMENTS

| | | | |
|---|---|---|---|
| 5,957,081 A | 9/1999 | van der Lely et al. | |
| 9,545,078 B1 * | 1/2017 | Yadin | A01J 5/017 |
| 2011/0168095 A1 * | 7/2011 | Larson | A01J 5/017 |
| | | | 119/14.1 |
| 2011/0308465 A1 * | 12/2011 | Siddell | A01K 1/12 |
| | | | 119/14.03 |
| 2012/0103266 A1 * | 5/2012 | Nilsson | A01K 1/126 |
| | | | 119/14.02 |
| 2012/0275894 A1 * | 11/2012 | Hofman | A01J 5/0175 |
| | | | 414/730 |
| 2013/0074775 A1 * | 3/2013 | Andersson | A01J 5/007 |
| | | | 119/14.04 |
| 2015/0059649 A1 * | 3/2015 | van der Sluis | A01K 1/12 |
| | | | 119/14.08 |
| 2015/0257355 A1 * | 9/2015 | Pinsky | A01J 7/02 |
| | | | 119/14.01 |
| 2017/0231186 A1 | 8/2017 | Rousseau et al. | |

FOREIGN PATENT DOCUMENTS

| | | | |
|---|---|---|---|
| EP | 0 951 822 A2 | 10/1999 | |
| WO | WO 2016/026034 A1 | 2/2016 | |
| WO | WO-2017034398 A1 * | 3/2017 | A01J 5/007 |
| WO | WO-2017095222 A1 * | 6/2017 | F15B 21/006 |

* cited by examiner

MILKING ROBOT SYSTEM WITH SELECTABLE COMPLIANCE

BACKGROUND

The present document relates to a milking robot system for milking a dairy animal in a milking session, and comprising teat cups, a robot arm with actuators, for connecting the teat cups to teats of the dairy animal, a control device, which is configured to reach and/or maintain a desired position of the robot arm, by adjustment of a respective adjusting force parameter exerted by the actuators.

Milking robots of this type have already long been known per se and are sold, for example, under the name Lely Astronaut® or DeLaval VMS™, for milking dairy animals such as, especially, cows.

Now dairy animals are living creatures which sometimes display a behaviour, whether unpredictable or not, in which they can kick away the robot arm or otherwise exert external forces on this robot arm. Since, in practice, a robot arm will usually be configured to reach and/or hold a desired position, the actuators of the robot arm will in that case, if it is established that this position begins to deviate, exert a larger force parameter value in order to attempt to still reach or hold this position. These forces, both the external forces and the forces exerted by the actuators themselves, do not just act on the robot arm and its actuators, but also on the frame from which the robot arm is suspended. A drawback in practice turns out to be that the robot arm, the actuators and/or the frame cannot always optimally handle these forces, which can lead to unwanted wear and tear or failure, and/or that the capacity or efficiency of the milking robot system is reduced by the fact that the dairy animals can unnecessarily prevent the connection of the teat cups by the robot arm.

BRIEF SUMMARY

An object of the present invention is to combat said drawbacks or at least provide a usable alternative to the known devices of the kind stated in the introduction.

The invention achieves this object in particular with a milking robot system for milking a dairy animal in a milking session, and comprising teat cups, a robot arm with actuators, for connecting the teat cups to teats of the dairy animal, a control device, which is configured to reach and/or maintain a desired position of the robot arm, by adjustment of a respective adjusting force parameter exerted by the actuators, wherein the control device is further configured to adjust a selectable compliance of the robot arm, or of at least one of the actuators of the robot arm, wherein the compliance, being a reaction of the robot arm, or at least of said at least one actuator, to an external force parameter which is exerted on the robot arm, or on said at least one actuator, is a function of the external force parameter and/or an identity of the dairy animal.

In the invention, use is made of the insight that the compliance of the robot arm, that is to say the reaction of the robot arm to external forces, does not always need to be the same, that it is sometimes better to move along therewith earlier, and sometimes better to longer develop a counterforce in order to hold a position. Said function indicates that, if the external force parameter varies, the adjusting force parameter per se can vary, and selection of the function then means that the adjusting force parameter can vary in various, selectable ways. In this connection, by "parameter" is in each case meant, for the sake of brevity, a parameter value.

It is not intended that the sort or type of parameter is changed. Moreover, the selection of another function does not mean that the adjusting force parameter (value) must be different for each external force parameter (value). It can also be that a reaction time/delay time acquires a different value, or the build-up of the adjusting force parameter over time, etc. All this will be further explained below, but important is that the reaction, the compliance, is selectable and is not always the same given a specific external force parameter.

It is here noted that both here and in the rest of this document, by "adjusting force parameter", "external force parameter", and, more generally, by "force parameter", in each case is meant a respective force or parameter associated therewith, which is used to characterise the action of the actuator. In this context, in addition to "force", a torque, as in actuators which create a rotation or which themselves rotate in order to effect a displacement, or a pressure, as in hydraulic, pneumatic, etc. actuators, should expressly be envisioned. For the adjusting force parameter, a current strength could even be used in the case of electric (electrohydraulic) actuators.

Particular embodiments are described in the dependent claims, as well as in the hereinafter following part of the description.

In embodiments, the control device is configured to select the compliance by altering said function and/or by increasing or lowering the adjusting force parameter of said at least one actuator for reaching and/or holding said desired position. This embodiment is not equal to the known standard compliance, wherein the adjusting force parameter is adjusted or raised according to a fixed function such that the desired position is (still) reached or held despite an external disturbing force (parameter). In the present embodiment, the adjusting force parameter, by contrast, is selected, so that the behaviour of the robot arm, or of the at least one actuator, can differ from milking to milking, in fact even without impact of an external force parameter. For example, the arm can then, if the adjusting force parameter is increased, move more rapidly, or, if the adjusting force parameter is lowered, less rapidly, under otherwise equal circumstances. This can offer advantages in the case of, for example, dairy animals which are sensitive or nervous, because a slower moving robot arm will be able to cause less shock reactions. Furthermore, it is possible that the control device is configured to change said function, for example by increasing the adjusting force parameter according to a predefined pattern, in particular in dependence on a user input for the milking. This entails selecting the arm behaviour in dependence on a user input, such as a designation "nervous", "new", "playful" or the like, wherein said pattern subsequently ensures that the adjusting force parameter is increased, for example, with an associated predefined delay time, and/or is increased, or, conversely, decreased, with a divergent rate. Thus also a desired position is reached later, or, conversely, earlier, or the robot arm, after having been pushed away, is moved more slowly, or conversely more rapidly, back again into the desired position.

In embodiments, the control device is configured to select the compliance by adjustment of a maximum adjusting force parameter of the at least one actuator. In the case of normal compliance, the control device will attempt, despite the acting external force parameter, to reach or maintain the desired position by (generally) increasing the adjusting force parameter. This increase is realised up to a maximum value, which, for example, is actuator-dependent. In other words, if a dairy animal, for example, exerts a force, such as by kicking away, the robot arm will offer resistance to a certain magnitude of the kicking force and still reach or maintain the desired position. Should the kicking force be greater, then the robot arm will be unable to offer sufficient resistance and will still be moved along with the kick. In the present embodiment, this maximum adjusting force parameter, in other words the maximum resistance, is selectable by the control system. In a known, conventional milking robot system, a stronger dairy animal will have less difficulty reaching the maximum adjusting parameter value and can thus kick away the robot arm relatively more easily than can a weaker dairy animal. In the present invention, this difference can be altered, made smaller, or even eliminated. Note that it can be advantageous to choose the maximum adjusting force parameter such that a dairy animal, in the case of a greatest exerted force, can move the robot arm away, especially by kicking it away. In a panic situation, for example, this can lessen the danger for the dairy animal. In customary milking robot systems, use hereof would lead to a fixed maximum adjusting force which is chosen for the relatively weakest animals. This means that the strongest animals can then often move the robot arm away too easily. By making the maximum adjusting force parameter, or resistance, selectable by the control device, i.e. adjustable, this negative behaviour can be expediently prevented.

In embodiments, the control device is configured to select the compliance, in the event that the external force parameter is so large that the robot arm, or the at least one actuator, is incapable of reaching or maintaining the desired position, by actively and automatically reducing the adjusting force parameter, in particular to a predefined lower limit, such as substantially zero, more particularly at most only for a predefined period. Where the effect of the external force parameter is too great and the robot arm must nevertheless move away from the desired position, these embodiments offer the advantage that the (external) forces acting on the milking system are not needlessly large and/or need to be long held. After all, there is not much sense in offering, and continuing to offer, maximum counterforce in all cases. It is then often better, for the load upon the milking robot system in general and upon the robot arm in particular, to at least temporarily go along with the external force parameter, and to reduce the adjusting force parameter. That can in principle be close to zero, but also, for example, a predefined lower limit, in order to prevent wild movements and deflections of the robot arm. Alternatively or additionally, it is possible to actively and automatically reduce the adjusting force parameter at most only for a predefined period. In these cases, account is also taken of the fact that the external force will usually be a kick or the like, which will act only for a short time and over a certain maximum range. After the kick etc., the control device can then make a new attempt to reach the desired position.

In embodiments, the control system comprises a counting device for counting during said milking session the number of times that an adjusting force parameter of at least a predefined threshold magnitude was set by the control system, in particular the number of times that the external force parameter was too large to reach or maintain the desired position, and/or the number of times that an attempt to connect one of the teat cups to the dairy animal by the robot arm failed, and wherein the control system is configured to select the compliance in dependence on the counted number. The number of times that an adjusting force parameter of at least a predefined threshold magnitude was set by the control system can here be regarded as the number of times that the dairy animal exerted an external force, especially the number of times that the dairy animal has kicked, regardless of whether this kick was strong enough to push away the robot arm. Said number can be an indication of nervousness or sensitivity of the dairy animal, which can be animal-dependent or even can differ from milking session to milking session. The control device can subsequently automatically take this into account by adapting the compliance in dependence thereon. For example, a new dairy animal, which has not yet previously been milked, will often be nervous, and will want to kick away the new, unfamiliar robot arm. The control device can then be configured to select a higher maximum adjusting force, so that ordinary kicking away will be more difficult. Thus the dairy animal will more quickly be able to get accustomed to the fact that milking will become a fixed part of its existence. On the other hand, it can happen, for example, that an already accustomed dairy animal, in a new milking session, suddenly kicks more. This could indicate, for example, an inflamed udder, or else a painful abnormality. The control device could then choose to select a lower maximum adjusting force parameter, so that the robot aim will yield earlier. In these and all other cases, the control system can furthermore, on the basis of the counted number, take additional measures, such as alerting of the farmer.

Note that the adjusting force parameter during normal and undisturbed movement of the robot arm will also be able to assume various values unequal to zero. Only once a predefined threshold value is exceeded, will the control device regard this as a reaction to an external force. In many embodiments, the control device itself already comprises a module for determining the adjusting force parameter, which, after all, is necessary to drive the actuator(s), and the control device can thus already itself determine the value of this adjusting parameter and compare it with the threshold value, including counting of the number of comparisons that indicate an exceeding of the threshold value. If so desired, a separate sensor device can, however, be provided for that purpose.

In particular, the control system is configured to increase the maximum adjusting force parameter in the event that the counted number exceeds a predefined threshold value. It holds that the control device can be configured to conduct said adaptation of the compliance, by increasing the maximum adjusting force parameter, only after the counted number reaches a defined threshold value, but alternatively or additionally also as another function of said number, such as an ascending function thereof. The threshold value can be, for example, two (kicks), but any other number is also possible, of course.

In embodiments, the milking robot system further comprises an animal identification system for determining an identity of the dairy animal to be milked, wherein the control system is configured to select the compliance in dependence on the determined identity. All aforementioned adjustments for selection of the compliance, such as adaptation, whether conditional or not, of a maximum adjusting force parameter, can in these embodiments be chosen on an animal-dependent basis. To this end, the milking robot system can contain animal (group)-dependent information in the customary animal management system provided therein, which information can be fetched and used by the control device on the basis of the identity. For example, for a new animal which is to be milked for the first time, it can already beforehand be chosen to increase the maximum adjusting force parameter, or, if an animal is known to be nervous or sensitive, to select the compliance with adapted adjustments for the normal and/or maximum adjusting force parameter.

Advantageously, the control device is configured to be self-learning, for automatic adaptation of the animal-dependent information in dependence on, in particular, the counted number per milking session. The control device can thus autonomously and automatically adapt the behaviour of the robot arm still better to the dairy animal.

For the sake of the adjustment of the maximum adjusting force, provisions are advantageously made in the milking system, such as a separate adjusting device for adjustment, by the control device, of this maximum adjusting force. This can in turn be realised as an adjustable (pressure relief) valve, an adjustable current limiter, etc., all of which will be explained in greater detail below in various embodiments.

In embodiments, the at least one actuator comprises a pneumatic actuator, and the milking robot system comprises a compressed air device and/or gas spring, adjustable by the control device. In such milking robot systems with pneumatic actuator there is a high degree of inherent compliance, owing to the compressibility of the pneumatic medium. A kick of the dairy animal will thus virtually always ensure that the robot arm moves away. Nonetheless, it is possible according to the invention to select the behaviour of the robot arm by varying actively and additionally the pressure of the medium, such as by accelerated supplying of compressed air, adjustment of an optionally provided accumulator to a smaller volume or a higher pressure, adjustment of an adjustable pressure relief valve, etc. To this end, the milking robot system is then in each case configured with the described components, such as an adjustable accumulator etc. Advantageously, the milking robot system comprises a pressure gauge, operatively connected to the control device, for measuring the pressure in the pneumatic actuator, wherein the control device is configured to adjust the compliance on the basis of the measured pressure.

In embodiments, alternatively or additionally, the at least one actuator comprises a hydraulic actuator having an oil pressure device, as well as a pressure relief valve, adjustable by the control device, and/or an accumulator. In hydraulic systems, there is scarcely any inherent compliance, owing to the very low compressibility of the hydraulic medium. In particular, the milking robot system can here comprise a pressure relief valve, which is hydraulically connected to the actuator and is adjustable by the control device and which opens whenever a maximum pressure in the actuator is exceeded, and/or an accumulator, which is adjustable by the control device. The accumulator here in a certain sense provides for compliance in the same and intrinsically known manner as in pneumatic systems. Advantageously, the milking robot system comprises a pressure gauge, operatively connected to the control device, for measuring the pressure in the hydraulic actuator, wherein the control device is configured to adjust the compliance on the basis of the measured pressure.

Alternatively or additionally, in embodiments the at least one actuator comprises an electromechanical and/or electrohydraulic actuator having an actuator control system adjustable by the control device. Actuators often have a much lower energy consumption, for example because they have no need for a continuous pressure in order to hold a specific position. An example of an electromechanical actuator of this type is a linear (spindle) drive, or an electrohydraulic actuator as described in U.S. Pat. No. 9,545,078-B1. In these kinds of actuators, the compliance can sometimes be somewhat more complex. The actuator usually contains an electric motor which has a maximum permitted current strength. An example is a linear drive, wherein a rotation about an axial direction provides a displacement along this axial direction, and wherein an external force in a specific direction will in turn be able to cause a rotation about said axial direction. Just as has already been described above, it can sometimes be advantageous to oppose this rotation as much as possible, and thus to select no or low compliance, and sometimes it is more advantageous to move along therewith, and therefore be compliant, for example in order to prevent overload of the electric motors. In particular, the actuator control system comprises an ammeter [or torque meter] and an adjustable current limiter for the actuator. The actuator control system can herein also be a component part of the control device. As a result of the adjustable current limiter, the electric motor of the actuator can draw an adjustable maximum current, and hence the maximum adjusting force parameter, usually a maximum torque, of the actuator can be set. This is a particularly expedient embodiment, since adjustable current limiters of this type can be realised relatively easily as an electronic circuit, and are also easily, accurately and rapidly controllable by the control device. In this way the possibility is provided to select in a simple manner the behaviour of the robot arm rapidly and reliably, even for each individual dairy animal and milking session.

BRIEF DESCRIPTION OF THE DRAWINGS

The invention will now be explained in greater detail on the basis of the drawing, which shows some illustrative embodiments and in which.

DETAILED DESCRIPTION

Figure 1:
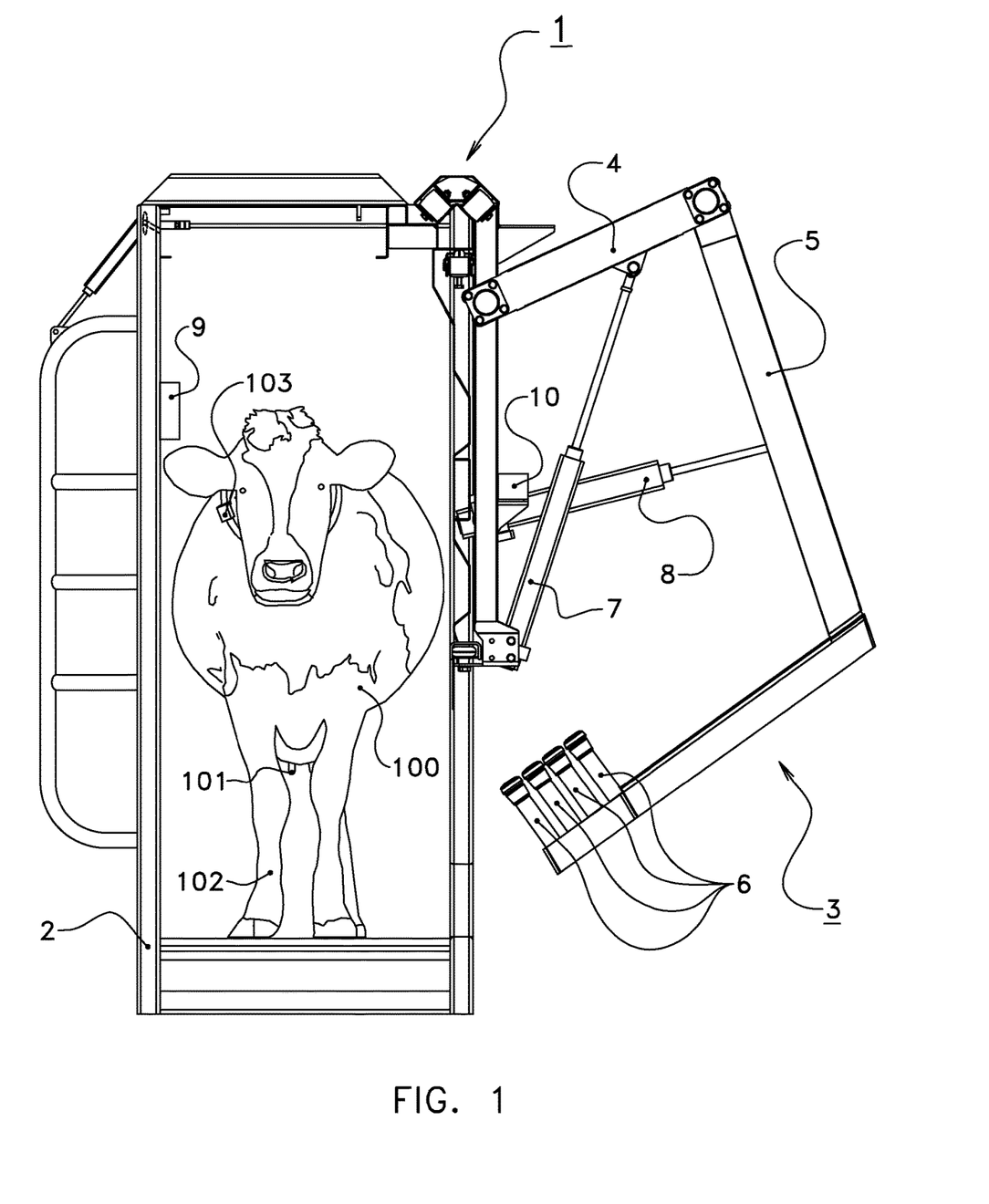
FIG. 1 shows a schematic front view of a milking system according to the invention.

FIG. 1 shows schematically a front view of a milking system 1 according to the invention. The milking system 1 comprises a milking box 2 with a milking robot 3 having a robot arm. The robot arm comprises a first robot arm part 4 and a second robot arm part 5 and teat cups 6, as well as a first actuator 7 and a second actuator 8. A tag reader is denoted by 9, and a control system by 10. Reference numeral 100 denotes a dairy animal with teats 101, legs 102 and an ID tag 103.

The shown milking system 1 is a robot milking system, wherein a dairy animal 100, whether voluntarily or not, presents for milking. The animal is then identified by the tag reader 9, which reads the ID tag 103. After this, a milking robot 3 will fit teat cups 6 to teats 101 of the dairy animal 100. The controlling of the robot arm is carried out by the control system 10, which can herein make use of stored data relating to the Identified animal. For details relating to teat detection, milking technology and other matters not relevant to the present invention, reference is here made to the literature.

When connecting the teat cups 6, the milking robot will move the first and second robot arm parts 4 and 5 with the aid of the first and second actuator 7 and 8 respectively. The actuators are, for example, pneumatic or hydraulic cylinders, or electric motor spindles or the like. The movement will in principle be realised with a fixed setting, i.e. with fixed values for the adjusting force parameter for the actuators 7 and 8. The movement will hence in principle always take place at the same speed.

In the known prior art, there are no exceptions hereto. According to the present invention, these do exist. For example, the data belonging to the identified animal comprise that the animal is nervous, is a new animal, has sensitive teats, etc. All these factors can be a reason to make the robot arm approach the animal more slowly, so that the dairy animal will be able to suffer less stress. Note that the adjusting force parameter will not be (much) greater during the whole movement, because the speed could then increase virtually limitlessly, but especially the initial acceleration, and, based on the duration of the initial acceleration, also the (end) speed of the movement, are truly dependent on this adjusting force parameter. The function serving the movement for connection of the teat cups 6 is then adapted, in dependence on the animal identification.

An adaptation of the adjusting force parameter(s) can also be carried out on the basis of other parameters or circumstances. For example, if connection fails as a result of wild movements of the dairy animal, as is evident from rapid changing of the detected position of the teats 101 or legs 102. In such a case, even if corresponding data has not been stored for the dairy animal concerned, the control system 10 can decide to nevertheless adapt the adjusting force parameter of the actuator 7 and/or 8, especially to reduce it, for a slower, more cautious movement.

Another important case in which adaptation of the function, the compliance, of the milking robot 3 can be relevant arises when the dairy animal 100 kicks the milking robot 3, especially the second arm part 5, which bears the teat cups 6. This, too, can be the case if the animal has sensitive teats 101, for example in the event of mastitis or the like, so that the milking will cause pain. In such a case, the kick of the dairy animal will often be relatively powerful, which is noticeable from the rapid displacement of the robot arm parts.

In reaction thereto, the control system 10 in the prior art will normally speaking increase the adjusting force parameter, such as an adjusting force or torque, of one or both actuators 7 and 8 in order still to reach the (teat) position, against the force of the kick. The increase will take place according to a fixed function of the external (kicking) force parameter. In this context, it can be chosen to raise the adjusting force parameter to, for example, a maximum value determined by the design. Another possible reaction is to make the arm move jointly to beyond the range of the leg 102, and afterward to use the original adjusting force parameter to displace the robot arm parts 4 and 5. In this context, the or each adjusting force parameter is either not changed during the kick, or is made smaller, even to zero, until the kick is over. In the prior art, this choice of the function, this course, is fixed, however, and is always the same.

It is possible, moreover, that the kick is not caused by pain or other discomfort, but by playfulness or unfamiliarity of the dairy animal. In the prior art, the dairy animal 100 could thus effectively prevent the milking, by respectively kicking away the milking robot 3, without there actually being a reason for this. The control system cannot then prevent that, since the compliance is a fixed function.

In the above-described cases, the present invention can offer advantages by virtue of the fact that the control system can adapt this compliance. For example, the control system can choose to increase the maximum adjusting force parameter in dependence on the specific animal identity. The result thereof is that the milking robot 3, in the case of more and also stronger kicks, still offers sufficient counterweight to not disturb the connecting process. Playful or unaccustomed animals 101 can thus be taught that the connection will still go on, and that kicking has no sense (any more). This raising can proceed gradually, for example in each case by a fixed or percentage value, up to the maximum, of course, defined by the design of the actuators 7, 8 and robot arm parts 4, 5. Should that maximum be reached, then there may however be more going on, and the control system 10 can choose to scale back down the or each adjusting force parameter, and perhaps give an alarm to the farmer via a means provided therefor (not represented).

Figure 2:
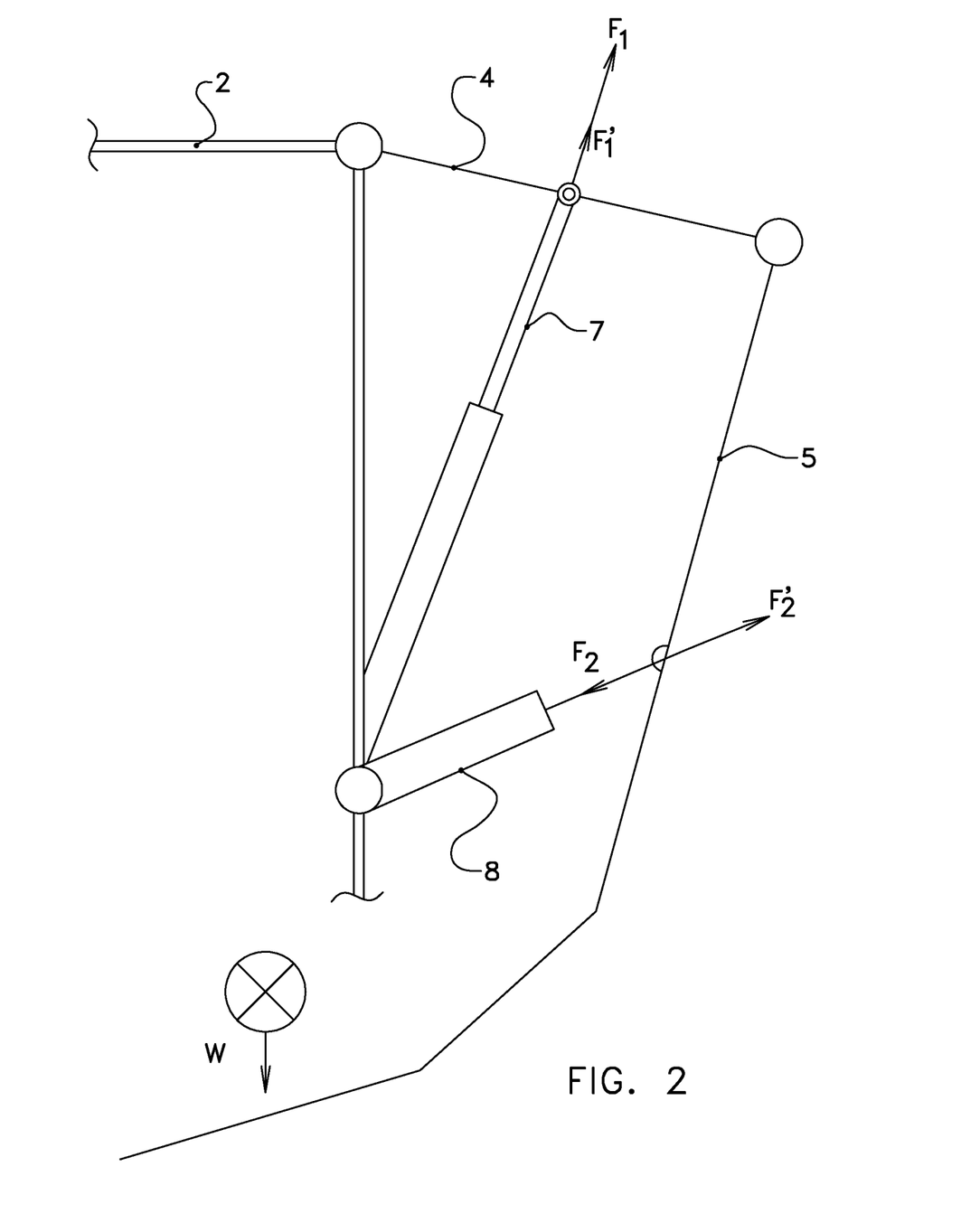
FIG. 2 shows a schematic force diagram, and FIG. 3a,b shows schematically some possible compliance functions.

FIG. 2 shows a force diagram in very schematic representation. In this, similar components are denoted by same reference numerals. Once again, a milking box 2 with robot arm parts 4 and 5 and first and second actuators 7 and 8 is shown.

In a standard connecting situation without external forces of a dairy animal, the first actuator 7, as the adjusting force parameter, exerts, for example, a force F1 on the first robot arm part 4, and a force F2 on the second robot arm part 5. These forces are necessary in order to compensate the gravitational force and friction, and together provide for the movement of the robot arm. The forces F1 and F2 are, of course, dependent on the position of the arm.

Should a dairy animal deliver a kick to the milking robot, an extra force W, for example, acts on the arm. The control system can then choose to change the adjusting force parameters, to F'1 in the case of the first actuator 7 and F'2 in the case of the second actuator 8. These forces are, for example, suitable for neutralising the effect of the kick, the force W, so that the robot arm, in nett terms, will not depart from its original path, apart from a reaction-induced delay. For the dairy animal, this will feel as if the robot arm parts 4 and 5 are totally unyielding. All this is suitable, for example, if the dairy animal in a previous milking session delivered a number of light, "playful" kicks, which do not indicate a discomfort or danger for the dairy animal. An unyielding milking robot can cure this behaviour in the dairy animal.

Note that the kicking force can be determined by the control system 10 by measuring a parameter value which is necessary to drive the actuator. After all, in the case of an electrically powered actuator 7, 8 a current will provide for the adjusting force. An ammeter of this type will be provided in the drive of the actuator(s) 7, 8 concerned, but is not represented. If this current must increase in order to effect a specific movement, an (effective) kicking force follows therefrom. From the measured current value, the control system 10 can then, for example, determine whether it is a case of a playful kick, or probably a pain kick or panic kick, which last two kicks will often be much stronger. The control system 10 can thus also determine, on the basis of the measured current strength or other adjusting parameter, whether and how the compliance of the milking robot 3 should be adapted, such as by adaptation of the maximum current in a current limiter provided for that purpose but not represented. For example, the actuator 7, 8 can be a pneumatic or hydraulic actuator, wherein a maximum adjusting force parameter, for example, can be provided as an adjustable pressure relief valve (not represented). A supporting gas spring with regulatable (maximum) gas pressure can also be provided.

Figure 3A:
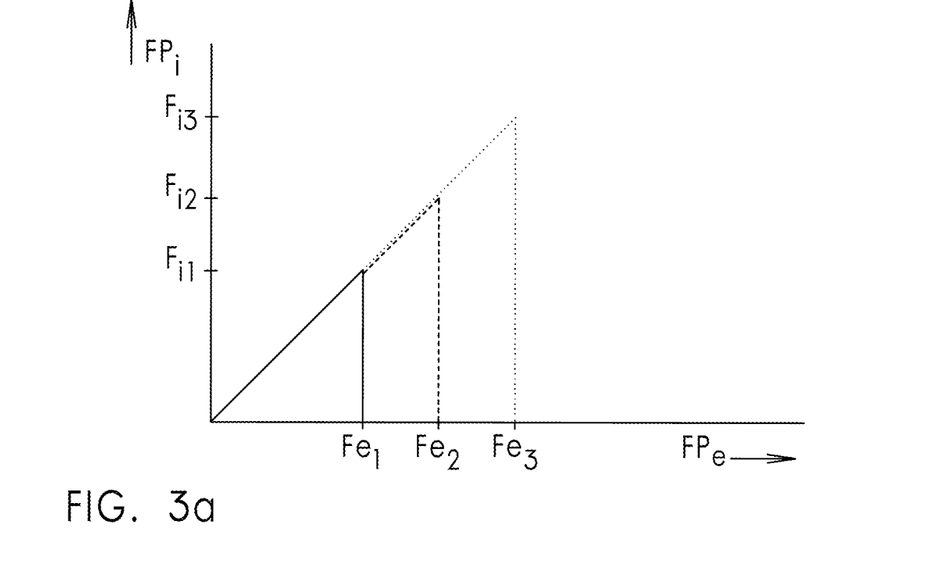
Figure 3B:
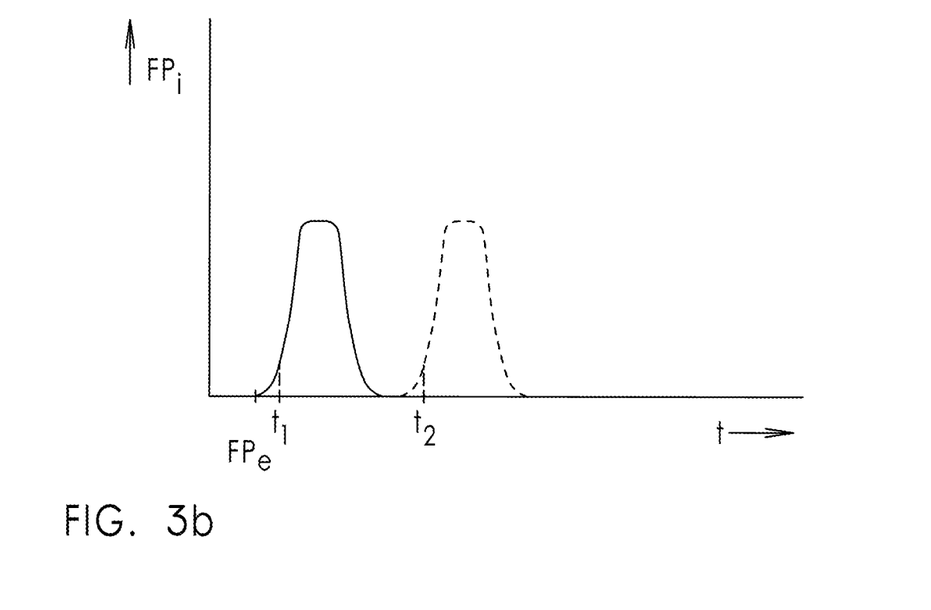

FIG. 3*a,b* shows schematically some possible compliance functions. In this, FIG. 3*a* shows a diagram which (for a specific position of the robot arm) represents for three different situations the adjusting force parameter value FPi as a (compliance) function of the value of the external force parameter value FPe. For the sake of convenience, a linear connection is assumed.

Situation 2 is, for example, the standard situation, and is portrayed with a dashed line. It can be seen that, as the external force parameter value FPe increases, the adjusting force parameter value FPi jointly increases up to a maximum value (here Fi2), and above this falls to zero. This means that the robot arm opposes a movement of the robot arm resulting from the external force up to a defined maximum (if FPe=Fe2), and above this totally yields. It is also possible that the adjusting force parameter just remains constant at that maximum, or actively begins to yield, but the person skilled in the art can easily implement this himself.

Situation 1 is portrayed with an unbroken line, and presents the case in which the dairy animal has sensitive teats or, for example, is nervous. It is then better to yield earlier. This is illustrated by the fact that the maximum adjusting force parameter value Fi1 is lowered. The robot arm will in fact yield already in the presence of a lower external force.

Situation 3 is portrayed with a dotted line and presents the case of a learning or playful cow, wherein it is of importance that it "learns" that it will be milked. To this end, the maximum adjusting force parameter FPi is raised to Fi3. Hence the robot arm will begin to yield only at a higher value Fe3 for the external force parameter value FPe.

FIG. 3b shows another way of adapting the compliance. Here situation 1, the unbroken line, shows a standard situation. In this case, the control system will in principle immediately, or at least as rapidly as possible, make the actuator generate a counterforce or extra adjusting force FPi as soon as there is a question of an external adjusting force (parameter). The magnitude thereof is, of course, variable, but does not play a role here. Of importance is the speed of reaction by the control system, and in this case this is immediate: starting point t1 follows very shortly after FPe, the (hypothetic or last) point at which the external force was acting. Situation 2 shows an example of, once again, a nervous or sensitive cow. The control system herein ensures that the compliance/reaction of the actuator(s) occurs much later: t2 lies much further after FPe than t1. That signifies in practice that the external force of a kick can effectively act on the robot arm in order to push this away, while the control system only afterward drives the actuator(s) in order to move back the robot arm. This is a gentler treatment for the animal than if the robot arm were to offer direct counterweight to the kick. Here, it is noted in general terms that the entire above discussion of embodiments is somewhat devoid of details such as reaction times in the control system, accuracy in adjustment, etc. In practice, a robot arm will never really be prevented from yielding somewhat under a kick, yet the underlying ideas with regard to the way in which the robot arm reacts, the compliance, are in fact valid.

The shown embodiments serve only to explain the invention, wherein the behaviour of the robot arm can be made independent of the animal identity and/or the animal behaviour, without limiting the invention. The scope of protection is defined on the basis of the appended claims.

The invention claimed is:

1. A milking robot system for milking a dairy animal in a milking session, comprising:
   teat cups,
   a robot arm with actuators, for connecting the teat cups to teats of the dairy animal, and
   a control device, which is configured to reach and/or maintain a desired position of the robot arm, by adjustment of a respective adjusting force parameter exerted by actuators,
   wherein the control device is further configured to adjust a selectable compliance of the robot arm, or of at least one of the actuators of the robot arm;
   wherein the compliance, being a reaction of the robot arm, and/or of said at least one actuator, to an external force parameter which is exerted on the robot arm, or on said at least one actuator, is a function of the external force parameter and/or an identity of the dairy animal, and
   wherein the control device is configured to select the compliance by altering said function.

2. The milking robot system as claimed in claim 1, wherein the control device is configured to select the compliance, in the event that the external force parameter is so large that the robot arm, or the at least one actuator, is incapable of reaching or maintaining the desired position, by actively and automatically reducing the adjusting force.

3. The milking robot system as claimed in claim 2, wherein the control device is configured to select the compliance by actively and automatically reducing the adjusting force to a predefined lower limit, and/or at most only for a predefined period.

4. The milking robot system as claimed in claim 3, wherein the predefined lower limit is substantially zero.

5. The milking robot system as claimed in claim 2, wherein the control device is configured to select the compliance by actively and automatically reducing the adjusting force to substantially zero, and/or at most only for a predefined period.

6. The milking robot system as claimed in claim 2, wherein the control device is configured to select the compliance by actively and automatically reducing the adjusting force at most only for a predefined period.

7. The milking robot system as claimed in claim 1, wherein the control system comprises a counting device for counting during said milking session a number of times that an adjusting force parameter of at least a predefined threshold magnitude was set by the control system, and
   wherein the control system is configured to select the compliance in dependence on the counted number.

8. The milking robot system as claimed in claim 6,
   wherein the control system is configured to increase a maximum adjusting force parameter in the event that the counted number exceeds a predefined threshold value.

9. The milking robot system as claimed in claim 7, wherein the counting device for counting during said milking session counts the number of times that the external force parameter was too large to reach or maintain the desired position.

10. The milking robot system as claimed in claim 7, wherein the counting device for counting during said milking session counts the number of times that an attempt to connect one of the teat cups to the dairy animal by the robot arm failed.

11. The milking robot system as claimed in claim 1, further comprising an animal identification system for determining an identity of the dairy animal to be milked, wherein the control system is configured to select the compliance in dependence on the determined identity.

12. The milking robot system as claimed in claim 1, wherein the at least one actuator comprises a pneumatic actuator, and wherein the milking robot system comprises a compressed air device and/or gas spring, adjustable by the control device.

13. The milking robot system as claimed in claim 1, wherein the at least one actuator comprises a hydraulic actuator having an oil pressure device, as well as a pressure relief valve, adjustable by the control device, and/or an accumulator.

14. The milking robot system as claimed in claim 1, wherein the at least one actuator comprises an electromechanical and/or electrohydraulic actuator having an actuator control system adjustable by the control device.

15. The milking robot system as claimed in claim 14, wherein the actuator control system comprises an ammeter and an adjustable current limiter for the actuator.

16. The milking robot system as claimed in claim 1, wherein the control device is configured to select the compliance by increasing or lowering the adjusting force parameter of said at least one actuator for reaching and/or holding said desired position.

17. The milking robot system as claimed in claim 1, wherein the control device is configured to select the compliance by adjustment of a maximum adjusting force parameter of the at least one actuator.

\* \* \* \* \*